(12) United States Patent
Bast et al.

(10) Patent No.: US 11,787,385 B2
(45) Date of Patent: Oct. 17, 2023

(54) AGRICULTURAL SYSTEM AND METHOD FOR PREVENTING ROLL-BACK OF AN AGRICULTURAL VEHICLE ON A SLOPED SURFACE

(71) Applicant: CNH Industrial America LLC, New Holland, PA (US)

(72) Inventors: Brent David Bast, Sioux Falls, SD (US); Nathan Paul Brooks, Manitowoc, WI (US); Steven Winkel, Elkhart Lake, WI (US); John Patrick Greifzu, Woodridge, IL (US)

(73) Assignee: CNH Industrial America LLC, New, PA (US)

( * ) Notice: Subject to any disclaimer, the term of this patent is extended or adjusted under 35 U.S.C. 154(b) by 321 days.

(21) Appl. No.: 17/334,165

(22) Filed: May 28, 2021

(65) Prior Publication Data
US 2022/0266811 A1    Aug. 25, 2022

Related U.S. Application Data

(60) Provisional application No. 63/151,921, filed on Feb. 22, 2021.

(51) Int. Cl.
*B60W 10/103* (2012.01)
*B60W 10/18* (2012.01)
(Continued)

(52) U.S. Cl.
CPC ......... *B60W 10/103* (2013.01); *A01B 59/002* (2013.01); *A01C 23/007* (2013.01);
(Continued)

(58) Field of Classification Search
CPC ......... B05B 15/65; B05B 12/16; B05B 15/55; B05B 1/02; B05B 12/02; B05B 12/081;
(Continued)

(56) References Cited

U.S. PATENT DOCUMENTS 5,452,946 A    9/1995 Warner
5,820,515 A   10/1998 Fukaya et al.
(Continued)

OTHER PUBLICATIONS

Nissan, "Hill Start Assistance", dated Feb. 26, 2021. (1 page) https://www.nissan-global.com/EN/TECHNOLOGY/OVERVIEW/hsa.html.
(Continued)

*Primary Examiner* — Colby M Hansen
(74) *Attorney, Agent, or Firm* — Rebecca Henkel; Rickard DeMille

(57) ABSTRACT

An agricultural method for preventing roll-back of an agricultural vehicle may include receiving a roll-back prevention input from a speed setting device indicative of a command to increase the transmission speed of the hydrostatic transmission while a service brake of the agricultural vehicle is engaged. Further, the method may include adjusting a speed mapping for the speed setting device from a predetermined speed mapping to a roll-back speed mapping in response to the roll-back prevention input, with the roll-back speed mapping being associated with a reduced speed range. Additionally, the method may include determining a transmission control command associated with a current position of the speed setting device based on the roll-back speed mapping and controlling an operation of the hydrostatic transmission to adjust the transmission speed based at least in part on the transmission control command.

16 Claims, 6 Drawing Sheets

(51) Int. Cl.
| | |
|---|---|
| B60W 30/18 | (2012.01) |
| B67D 7/36 | (2010.01) |
| B67D 7/02 | (2010.01) |
| G01M 3/32 | (2006.01) |
| A01M 7/00 | (2006.01) |
| A01C 23/00 | (2006.01) |
| G05D 1/00 | (2006.01) |
| G07C 5/00 | (2006.01) |
| G07C 5/08 | (2006.01) |
| A01D 41/127 | (2006.01) |
| A01D 69/00 | (2006.01) |
| B05B 15/55 | (2018.01) |
| A01C 23/04 | (2006.01) |
| B05B 12/08 | (2006.01) |
| B67D 7/38 | (2010.01) |
| B67D 7/78 | (2010.01) |
| B67D 99/00 | (2010.01) |
| B05B 12/14 | (2006.01) |
| A01B 59/00 | (2006.01) |
| E02F 3/46 | (2006.01) |
| E02F 9/22 | (2006.01) |
| B05B 15/65 | (2018.01) |
| B05B 12/16 | (2018.01) |
| B05B 1/20 | (2006.01) |
| B05B 12/02 | (2006.01) |
| B08B 3/02 | (2006.01) |
| B08B 5/02 | (2006.01) |
| B60W 40/076 | (2012.01) |
| B05B 14/00 | (2018.01) |
| G01F 23/70 | (2006.01) |

(52) U.S. Cl.
CPC .......... *A01C 23/008* (2013.01); *A01C 23/047* (2013.01); *A01D 41/1274* (2013.01); *A01D 69/00* (2013.01); *A01M 7/0042* (2013.01); *A01M 7/0057* (2013.01); *A01M 7/0085* (2013.01); *A01M 7/0089* (2013.01); *B05B 1/20* (2013.01); *B05B 12/02* (2013.01); *B05B 12/081* (2013.01); *B05B 12/085* (2013.01); *B05B 12/14* (2013.01); *B05B 12/16* (2018.02); *B05B 15/55* (2018.02); *B05B 15/65* (2018.02); *B08B 3/02* (2013.01); *B08B 5/02* (2013.01); *B60W 10/18* (2013.01); *B60W 10/182* (2013.01); *B60W 30/18118* (2013.01); *B60W 40/076* (2013.01); *B67D 7/02* (2013.01); *B67D 7/0294* (2013.01); *B67D 7/36* (2013.01); *B67D 7/362* (2013.01); *B67D 7/38* (2013.01); *B67D 7/78* (2013.01); *B67D 99/00* (2013.01); *E02F 3/46* (2013.01); *E02F 9/2271* (2013.01); *E02F 9/2275* (2013.01); *G01M 3/3245* (2013.01); *G05D 1/0016* (2013.01); *G07C 5/008* (2013.01); *G07C 5/08* (2013.01); *B05B 14/00* (2018.02); *B08B 2203/0205* (2013.01); *B60W 2520/10* (2013.01); *G01F 23/70* (2013.01); *G05D 2201/0201* (2013.01)

(58) Field of Classification Search
CPC ..... B05B 12/085; B05B 12/14; A01B 59/002; A01C 23/007; A01C 23/008; A01C 23/047; A01D 41/1274; A01D 69/00; A01M 7/0042; A01M 7/0057; A01M 7/0085; A01M 7/0089; B60W 10/103; B60W 10/18; B60W 10/182; B60W 10/18118; B60W 40/076; B67D 7/02; B67D 7/0294; B67D 7/36; B67D 7/362; B67D 7/38; B67D 7/78; B67D 99/00; E02F 3/46; E02F 9/2271; E02F 9/2275; G01M 3/3242; G05D 1/0016; G07C 5/008; G07C 5/08
USPC ......................................................... 701/53
See application file for complete search history.

(56) References Cited

U.S. PATENT DOCUMENTS

| | | | |
|---|---|---|---|
| 5,863,277 | A * | 1/1999 | Melbourne .......... F02D 41/083 477/203 |
| 5,984,429 | A | 11/1999 | Nell et al. |
| 6,814,414 | B1 | 11/2004 | Schmitt et al. |
| 7,934,589 | B2 | 5/2011 | Groner et al. |
| 8,078,378 | B2 | 12/2011 | Bradley, IV |
| 8,565,994 | B2 | 10/2013 | Mallet |
| 8,649,948 | B2 | 2/2014 | Yanagida et al. |
| 9,370,175 | B2 | 6/2016 | Swinney, II et al. |
| 9,470,157 | B2 | 10/2016 | Liu et al. |
| 9,849,884 | B2 | 12/2017 | Kim |
| 10,407,067 | B2 | 9/2019 | Henel et al. |
| 2006/0129299 | A1 * | 6/2006 | Schmidt .................. B60T 7/122 701/71 |
| 2013/0256052 | A1 | 10/2013 | Kamisetty et al. |
| 2014/0249729 | A1 | 9/2014 | Schwartz et al. |
| 2016/0023660 | A1 * | 1/2016 | Yu ....................... B60W 10/184 477/203 |
| 2017/0043767 | A1 * | 2/2017 | Khafagy ............... B60W 30/16 |
| 2020/0216141 | A1 | 7/2020 | Murthy |

OTHER PUBLICATIONS

Mazda, "Active Safety Technology—HLA: Hill Launch Assist", dated Feb. 26, 2021. (1 page) https://www.mazda.com/en/innovation/technology/safety/active_safety/hla/.

Subaru, "Hill Start Assist System", Subaru Forester 2012-2021 Owner's Manual, dated Feb. 26, 2021. (5 pages) http://www.subsuv.com/subco-412.html.

Lampton, Christopher, "How Hill-Start Control Works", HowStuffWorks, dated Feb. 26, 2021. (6 pages) https://auto.howstuffworks.com/car-driving-safety/safety-regulatory-devices/hill-start-control.htm.

National Safety Council "Hill Start Assist", MyCarDoesWhat, dated Feb. 26, 2021 (4 pages) https://mycardoeswhat.org/safety-features/hill-start-assist/.

* cited by examiner

AGRICULTURAL SYSTEM AND METHOD FOR PREVENTING ROLL-BACK OF AN AGRICULTURAL VEHICLE ON A SLOPED SURFACE

CROSS-REFERENCE TO RELATED APPLICATION

The present application is based upon and claims the right of priority to U.S. Provisional Patent Application No. 63/151,921 filed on Feb. 22, 2021, the entirety of which is incorporated by reference herein for all purposes.

FIELD OF THE INVENTION

The present disclosure relates generally to agricultural vehicles, such as agricultural sprayers, and, more particularly, to agricultural systems and methods for preventing roll-back of an agricultural vehicle on a sloped surface after release of a service brake.

BACKGROUND OF THE INVENTION

Agricultural applicators or sprayers have been used within the industry for applying an agricultural product to crops and/or a surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s). Typically, an applicator or sprayer is pulled as an implement or is self-propelled, and includes a tank, a pump, and a sprayer boom. The sprayer boom can include a pair of boom arms, with each boom arm extending to either side of the sprayer when in an unfolded state. Each boom arm may include multiple boom sections, each with a number of spray nozzles (also sometimes referred to as spray tips).

Typically, when an agricultural sprayer has a hydrostatic transmission, the hydrostatic transmission is prevented from ramping up the transmission output speed while the service brake is engaged so that the transmission and/or the service brake is not damaged. As such, the transmission is only allowed to increase the transmission output speed to drive the vehicle when the service brake is released or disengaged. In the case where an agricultural sprayer is held stationary on a sloped surface (e.g., hill) by the engaged service brake, the agricultural sprayer may experience roll-back in the down-hill direction when the service brake is released until the output speed of the transmission is sufficiently ramped up to move the agricultural sprayer uphill.

Accordingly, an agricultural system and method for preventing roll-back of an agricultural vehicle, such as an agricultural sprayer, on a sloped surface would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural method for preventing roll-back of an agricultural vehicle, where the agricultural vehicle includes a hydrostatic transmission and a speed setting device for commanding a selected transmission speed of the hydrostatic transmission. The speed setting device may be movable across a plurality of positions, with each position of the speed setting device being associated with a different transmission speed across a speed range for the agricultural vehicle according to a predetermined speed mapping for the speed setting device. The agricultural vehicle may further include a brake input device movable for selectively engaging a service brake of the agricultural vehicle. The method may include receiving, with one or more computing devices, an input indicative of the brake input device being used to engage the service brake. The method may further include receiving, with the one or more computing devices, a roll-back prevention input from the speed setting device indicative of a command to increase the transmission speed of the hydrostatic transmission while the service brake is engaged. Further, the method may include adjusting, with the one or more computing devices, an applicable speed mapping for the speed setting device from the predetermined speed mapping to a roll-back speed mapping in response to the roll-back prevention input. The roll-back speed mapping is associated with a reduced speed range as compared to the speed range for the predetermined speed mapping. Moreover, the method may include determining, with the one or more computing devices, a transmission control command associated with a current position of the speed setting device based on the roll-back speed mapping. Additionally, the method may include controlling, with the one or more computing devices, an operation of the hydrostatic transmission to adjust the transmission speed based at least in part on the transmission control command.

In another aspect, the present subject matter is directed to an agricultural system for preventing roll-back of an agricultural vehicle. The agricultural system may include a hydrostatic transmission for selectively driving one or more wheels of the agricultural vehicle and a speed setting device for commanding a selected transmission speed of the hydrostatic transmission. The speed setting device is movable across a plurality of positions, with each position of the speed setting device being associated with a different transmission speed across a speed range for the agricultural vehicle according to a predetermined speed mapping for the speed setting device. The agricultural system may further include a brake input device movable for selectively engaging a service brake, where the service brake prevents movement of the one or more wheels when engaged. The brake input device is movable between an engaged position, associated with the service brake being engaged, and a disengaged position, associated with the service brake being disengaged. Additionally, the agricultural system may include a computing system communicatively coupled to the hydrostatic transmission, the speed setting device, and the brake input device. The computing system may be configured to receive an input indicative of the brake input device being used to engage the service brake and receive a roll-back prevention input from the speed setting device indicative of a command to increase the transmission speed of the hydrostatic transmission while the service brake is engaged. In response to the roll-back prevention input, the computing system may adjust an applicable speed mapping for the speed setting device from the predetermined speed mapping to a roll-back speed mapping, where the roll-back speed mapping is associated with a reduced speed range as compared to the speed range for the predetermined speed mapping. The computing system may further determine a transmission control command associated with a current position of the speed setting device based on the roll-back speed mapping. Additionally, the computing system may control an operation of the hydrostatic transmission to adjust the transmission speed based at least in part on the transmission control command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
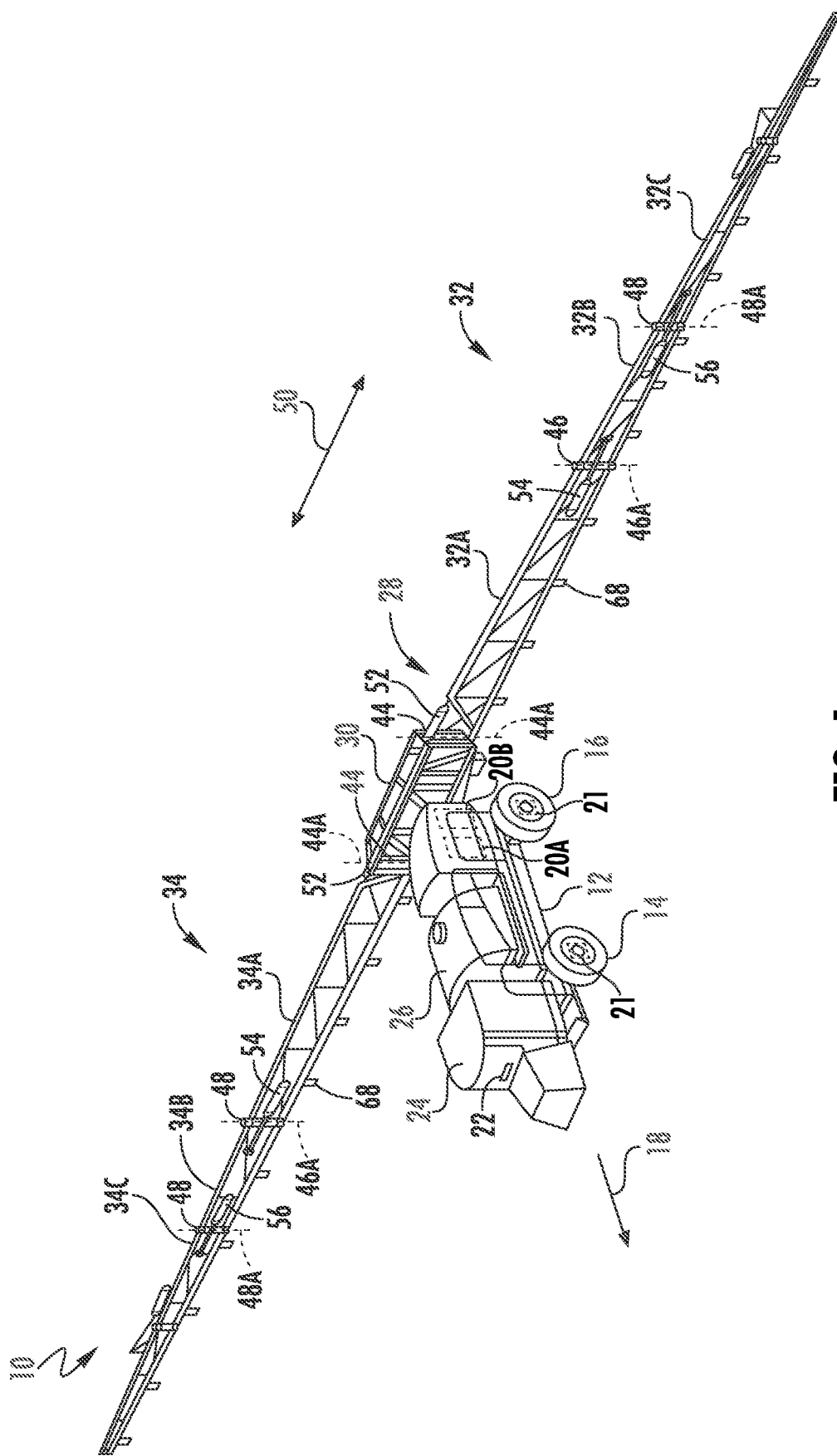
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for preventing roll-back of an agricultural vehicle, such as an agricultural sprayer, particularly when the agricultural vehicle is on a sloped surface. Specifically, in several embodiments, an agricultural system for preventing roll-back of an agricultural vehicle includes a hydrostatic transmission, a speed setting device (e.g., handle) for commanding a selected output speed of the hydrostatic transmission, and a brake input device for selectively engaging a service brake of the agricultural vehicle. Each position of the speed setting device is generally associated with a different transmission output speed across a speed range for the agricultural vehicle according to a predetermined speed mapping. Typically, when the brake input device is moved such that the service brake is engaged, the hydrostatic transmission is controlled to be in neutral (e.g., have a zero output speed) to protect both the transmission and service brake from damage. However, in instances where the service brake is being used to hold the agricultural vehicle stationary on a sloped or inclined surface (e.g., hill), the agricultural vehicle may experience a roll-back in the downhill direction of the incline when the service brake is disengaged until the output speed of the transmission ramps up sufficiently to overcome the downhill force.

Thus, in accordance with aspects of the present subject matter, a controller of the disclosed system may be configured to adjust an applicable speed mapping for the speed setting device from the predetermined speed mapping to a roll-back speed mapping when an input is received from the speed setting device while the service brake is still engaged. The roll-back speed mapping allows the transmission to ramp up its output speed to a limited extent in accordance with the roll-back speed mapping while the service brake is still engaged. For instance, the speed range associated with the roll-back speed mapping may generally correspond to a reduced speed range having a lower maximum speed than the predetermined speed mapping. Preferably, the roll-back speed mapping allows the transmission speed to be increased slightly while the service brake is still engaged such that, when then service brake is subsequently released, the transmission output speed is high enough to at least partially reduce or prevent roll-back of the agricultural vehicle. Once the service brake is fully released, the controller may return the speed mapping of the speed setting device to the predetermined speed mapping.

As shown in FIG. 1, the agricultural sprayer 10 may include a chassis or frame 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine 20A and a hydrostatic transmission 20B configured to transmit power from the engine to the wheels 14, 16. However, it should be appreciated that, in further embodiments, the front wheels 14 of the agricultural sprayer 10 may be driven in addition to or in lieu of the rear wheels 16. Further, the agricultural sprayer 10 may include one or more service brakes 21 selectively engageable to brake or prevent movement (i.e., rotation) of the front and/or rear wheels 14, 16. For instance, the service brake 21 may include hydraulically actuated caliper brakes that apply a braking force to the rotors of the associated wheels 14, 16 to slow down and/or stop the agricultural sprayer.

The frame 12 may also support an operator's cab 24 that houses various control or input devices (e.g., levers, pedals, control panels, buttons, and/or the like) for permitting an operator to control the operation of the sprayer 10. For instance, as shown in FIG. 1, the agricultural sprayer 10 may include a human-machine or user interface 22 for displaying message windows and/or alerts to the operator and/or for allowing the operator to interface with the vehicle's controller or computing system. In one embodiment, as will be described below in greater detail, the user interface 22 may include joysticks, buttons, knobs and/or any other suitable input devices that allow the operator to provide user inputs to an associated controller or computing system.

Furthermore, the frame 12 may also support one or more tanks 26 and a frame or boom assembly 28 mounted on the frame 12. Each tank 26 is generally configured to store or hold an agricultural product, such as a pesticide, a nutrient, and/or the like. A plurality of nozzle assemblies 68 are mounted on the boom assembly 28 and configured to selectively dispense the agricultural product stored in the associated tank 26 via nozzles onto underlying plants and/or soil. The nozzle assemblies 68 are generally spaced apart from each other on the boom assembly 28 along a lateral direction 50. Furthermore, fluid conduits (not shown) may fluidly couple the nozzle assemblies 68 to the tank(s) 26. Each nozzle assembly 68 may include a nozzle valve (not shown) and an associated spray tip or spray nozzle (not shown). In several embodiments, the operation of each nozzle valve may be individually controlled by an associated controller or computing system such that the valve regulates the flow rate and/or other spray characteristic of the agricultural product through the associated spray nozzle.

Figure 2:
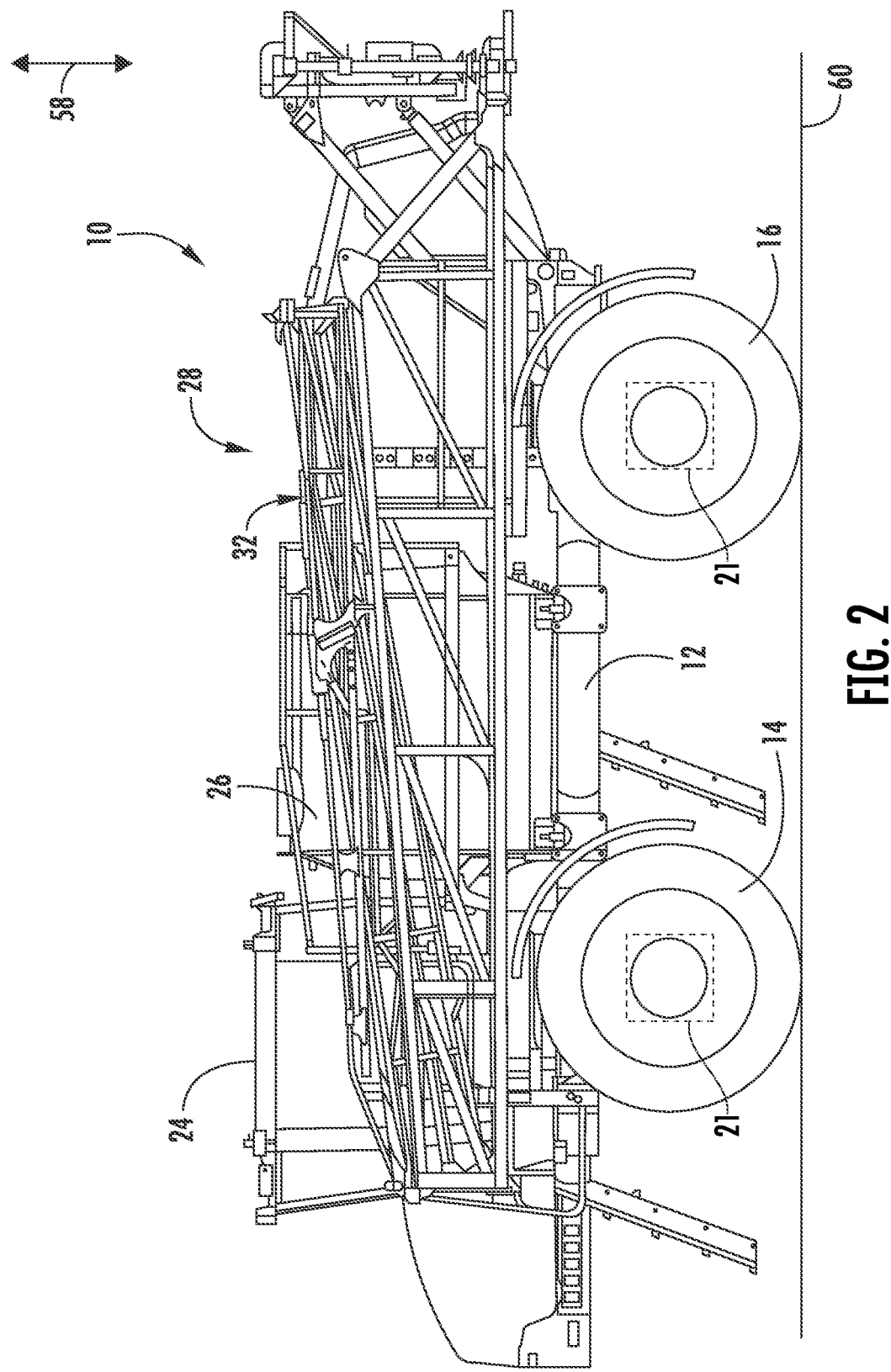
FIG. 2 illustrates a side view of the agricultural sprayer of FIG. 1 in accordance with aspects of the present subject matter.

As shown in FIGS. 1 and 2, the boom assembly 28 of the agricultural sprayer 10 may generally be movable between a working or unfolded position (FIG. 1) and a transport or folded position (FIG. 2). In the working position, various sections of the boom assembly 28 are fully extended such that the boom assembly 28 extends over as wide a section of a field as possible. In the transport position, the various sections of the boom assembly 28 are fully retracted to reduce the width of the sprayer 10 for travel. As will be described below, the boom assembly 28 may include a plurality of fold actuators coupled between adjacent boom sections of the boom assembly 28 for moving the boom assembly 28 between the working and transport positions.

As shown in FIG. 1, in one embodiment, the boom assembly 28 includes a central boom section 30, a left boom arm 32, and a right boom arm 34. The left boom arm 32 includes a left inner boom section 32A pivotably coupled to the central boom section 30, a left middle boom section 32B pivotably coupled to the left inner boom section 32A, and a left outer boom section 32C pivotably coupled to the left middle boom section 32B. Similarly, the right boom arm 34 includes a right inner boom section 34A pivotably coupled to the central boom section 30, a right middle boom section 34B pivotably coupled to the right inner boom section 34A, and a right outer boom section 34C pivotably coupled to the right middle boom section 34B. Each of the inner boom sections 32A, 34A is pivotably coupled to the central boom section 30 at pivot joints 44. Similarly, the middle boom sections 32B, 34B are pivotably coupled to the respective inner boom sections 32A, 34A at pivot joints 46 while the outer boom sections 32C, 34C are pivotably coupled to the respective middle boom sections 32B, 34B at pivot joints 48.

As is generally understood, pivot joints 44, 46, 48 may be configured to allow relative pivotal motion between adjacent boom sections of the boom assembly 28. For example, the pivot joints 44, 46, 48 may allow for articulation of the various boom sections between a fully extended or working position (e.g., as shown in FIG. 1), in which the boom sections are unfolded along the lateral direction 50 to allow for the performance of an agricultural spraying operation, and a transport position (FIG. 2), in which the boom sections are folded inwardly to reduce the overall width of the boom assembly 28 along the lateral direction 50. It should be appreciated that, although the boom assembly 28 is shown in FIG. 1 as including a central boom section and three individual boom sections coupled to each side of the central boom sections, the boom assembly 28 may generally have any suitable number of boom sections. For example, in other embodiments, each boom arm 32, 34 may include four or more boom sections or less than three boom sections.

Additionally, as shown in FIG. 1, the boom assembly 28 may include inner fold actuators 52 coupled between the inner boom sections 32A, 34A and the central boom section 30 to enable pivoting or folding between the fully-extended working position and the transport position. For example, by retracting/extending the inner fold actuators 52, the inner boom sections 32A, 34A may be pivoted or folded relative to the central boom section 30 about a pivot axis 44A defined by the pivot joints 44. Moreover, the boom assembly 28 may also include middle fold actuators 54 coupled between each inner boom section 32A, 34A and its adjacent middle boom section 32B, 34B and outer fold actuators 56 coupled between each middle boom section 32B, 34B and its adjacent outer boom section 32C, 34C. As such, by retracting/extending the middle and outer fold actuators 54, 56, each middle and outer boom section 32B, 34B, 32C, 34C may be pivoted or folded relative to its respective inwardly adjacent boom section 32A, 34A, 32B, 34B about a respective pivot axis 46A, 48A. When moving to the transport position, the boom assembly 28 and fold actuators 52, 54, 56 are typically oriented such that the pivot axes 44A, 46A, 48A are parallel to the vertical direction 58 and, thus, the various boom sections 32A, 34A, 32B, 34B, 32C, 34C of the boom assembly 28 are configured to be folded horizontally (e.g., parallel to the lateral direction 50) about the pivot axes 44A, 46A, 48A to keep the folding height of the boom 28 as low as possible for transport. However, the pivot axes 44A, 46A, 48A may be oriented along any other suitable direction.

It should be appreciated that the specific configuration of the agricultural sprayer 10 described above and shown in FIGS. 1 and 2 is provided only to place the present subject matter in an exemplary field of use. In this regard, it should be apparent to those of ordinary skill in the art that the present subject matter may be readily adaptable to any manner of machine configuration that is consistent with the disclosure provided herein.

Figure 3A:
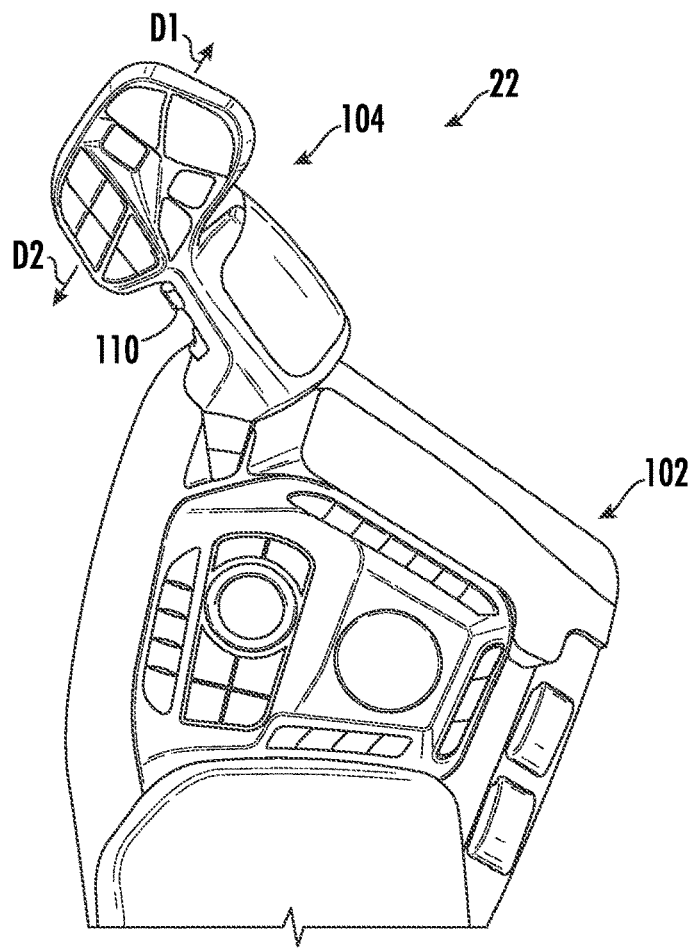
FIGS. 3A and 3B illustrate various views of portions of a user interface suitable for use with a system for preventing roll-back of an agricultural vehicle in accordance with aspects of the present subject matter.
Figure 3B:
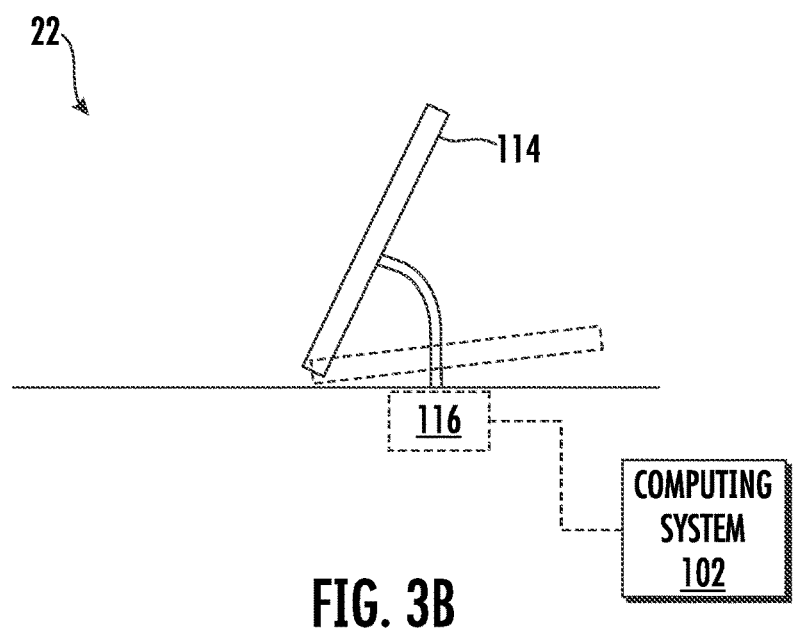

Referring now to FIGS. 3A and 3B, one embodiment of a user interface 22 suitable for use with a system for preventing roll-back of an agricultural vehicle, such as an agricultural sprayer (e.g., agricultural sprayer 10), is illustrated in accordance with aspects of the present subject matter. Particularly, in some embodiments, as shown in FIG. 3A, the user interface 22 includes an armrest control panel 102 (hereinafter referred to as "armrest 102") and a multi-function handle 104 (hereinafter referred to as "handle 104"). The handle 104 is generally movable relative to the armrest 102 for commanding an output speed of the hydrostatic transmission 20B (FIG. 1) which controls a ground speed of the agricultural sprayer 10. For instance, the handle 104 may be movable relative to the armrest 102 across a range of positions. For example, the handle 104 may be movable in a first or forward direction D1 to a maximum forward position (not shown) and/or in a second or rearward direction D2, opposite the forward direction D1, to a maximum rearward position (not shown). Each position of the handle 104 between the maximum forward and rearward positions may generally correspond to a different output speed of the hydrostatic transmission across a transmission output speed range, and thus a different ground speed of the agricultural sprayer 10, where the transmission output speed range extends from a minimum transmission output speed to a maximum transmission output speed. For instance, each position of the handle 104 may correspond to a discrete speed within the transmission output speed range or a percentage of the maximum transmission output speed of the transmission output speed range.

It should be appreciated that, while the handle 104 is described and shown as a speed control lever, joystick, or handle, the handle 104 may be configured as any suitable user input device that is actuatable across a range of positions such as a scroll-wheel, a knob, and/or the like. It should additionally be appreciated that, in some embodiments, the handle 104 may be configured as a spring-biased, return-to-neutral position handle where the selected speed may be selected by an operator holding the return-to-neutral handle 104 in a position associated with the selected speed for a threshold period of time before releasing. For instance, an operator may hold the handle 104 in the position associated with the selected speed for 0.5 seconds, 1 second, and/or the like before releasing in order to set the selected speed. Alternatively, the handle 104 may be configured to maintain an operator-selected position associated with a desired speed of the sprayer 10 after being released by the operator instead of returning to a neutral position.

In some embodiments, the sprayer 10 is configured to be operated within a given speed range of a plurality of operator-selectable transmission output speed ranges. In such embodiments, the user interface 22 further includes a range selector device 108 (FIG. 5) for selecting between the plurality of transmission output speed ranges. Each speed range of the plurality of transmission output speed ranges has a minimum range speed and a maximum range speed. In some embodiments, each speed range has a maximum range speed that differs from the maximum range speeds of the remainder of the plurality of speed ranges. Additionally, in some embodiments, the minimum range speed and/or the maximum range speed of each speed range may be adjustable. For instance, the user interface 22 may further include a range adjustor device 110 for adjusting the minimum range speed and/or the maximum range speed of a selected speed range. It should be appreciated that the range selector device 108 (FIG. 5) and the range adjustor device 110 may each correspond to any suitable input device, or combination of input devices, for adjusting the minimum and/or maximum range speeds such as one or more buttons, scroll wheels, knobs, sliders, and/or any other suitable input device on the armrest 102, handle 104, display screen 112 (FIG. 4) and/or at any other suitable location within the cab 24.

In one embodiment, when an operator switches to a different speed range of the plurality of transmission output speed ranges using the range selector device 108, the most recent actuated or selected position of the handle 104 is then associated with a respective, selected speed of the newly selected transmission output speed range. For instance, if the handle 104 was actuated to the maximum forward position associated with 100% of a first transmission output speed range (e.g., associated with a ground speed of 10 MPH) and an operator subsequently selected a second transmission output speed range, the selected transmission output speed then becomes 100% of the second transmission output speed range (e.g., associated with a ground speed of 15 MPH). However, in other embodiments, switching between different transmission output speed ranges may cause any other suitable change in the selected speed or may not result in any change in the transmission output speed until the operator actuates the handle 104.

Moreover, in some embodiments, a display screen 112 (FIG. 5) of the user interface 22 may be configured to display to the operator the selected speed, a current ground speed of the sprayer 10, the plurality of transmission output speed ranges (or associated ground speed ranges), the selected transmission output speed range (or associated ground speed range), and/or the like. The display screen 112 may include a touchscreen mounted within a cockpit module, an instrument cluster, and/or any other location within the cab 24. The display 112 may be capable of displaying information related to the operation of the sprayer 10, such as the selected speed, the current ground speed of the sprayer 10, the selected ground speed range, and/or the like. In one embodiment, the display 112 may include an input device in the form of circuitry within the touchscreen to receive an input corresponding with a location over the display 112.

Additionally, in some embodiments, the user interface 22 includes a brake input device 114, as shown in FIG. 3B, that is movable for selectively engaging the service brake(s) 21. For instance, the brake input device 114 may be movable between an engaged position (as shown in dashed lines), associated with the service brake 21 being engaged, and a disengaged position (as shown in solid lines), associated with the service brake 21 being disengaged or released. For example, when the brake input device 114 is moved towards the engaged position, more hydraulic or brake fluid may be supplied to the service brake 21 to apply more braking force to slow down and/or stop rotation of the wheels 14, 16. Similarly, when the brake input device 114 is moved towards the disengaged position, less hydraulic or brake fluid is supplied to the service brake 21, resulting in less braking force on the wheels 14, 16 against rotation. It should be appreciated that the brake input device 114 may be any suitable device for selectively engaging the service brake 21, such as a foot pedal, hand lever, button, and/or the like. A brake sensor 116 may be configured to generate data indicative of the engagement of the service brake 21. More particularly, the brake sensor 116 may be configured to generate data indicative of a position of the brake input device 114 which may, in turn, be indicative of the engagement of the service brake 21. The brake sensor 116 may be communicatively coupled to the computing system 202 such that data generated by the brake sensor 116 may be transmitted to the computing system 202 for subsequent processing and/or storage. The brake sensor 116 may comprise any suitable sensor for generating data indicative of the engagement of the service brake 21, such as a displacement sensor, a rotational sensor, a pressure sensor, and/or the like.

Figure 4:
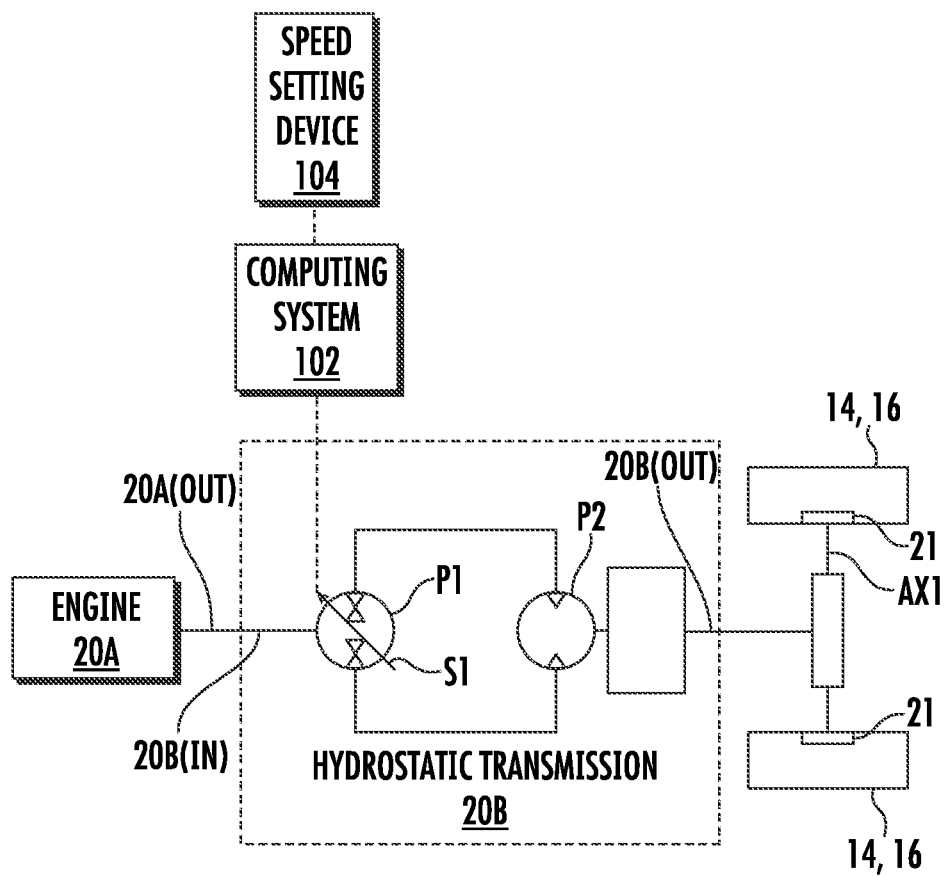
FIG. 4 illustrates a schematic view of a hydrostatic drive suitable for use with a system for preventing roll-back of an agricultural vehicle in accordance with aspects of the present subject matter.
Figure 5:
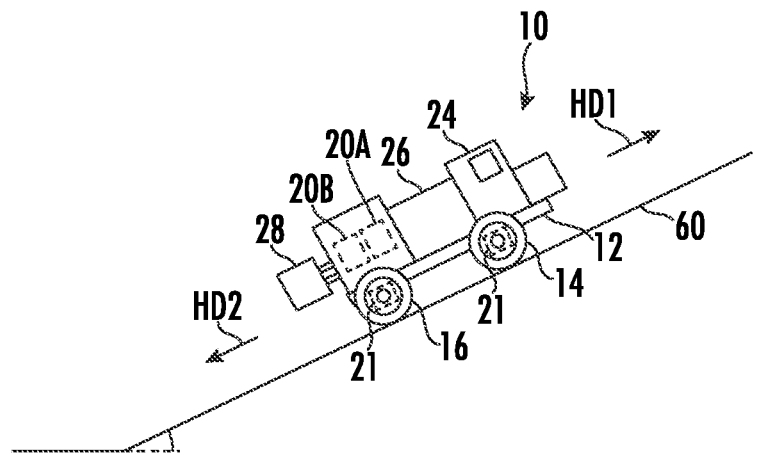
FIG. 5 illustrates a side view of the agricultural sprayer of FIG. 1 on a sloped surface in accordance with aspects of the present subject matter.

As indicated above, when the service brake 21 is engaged, control measures are typically in place that prevent the hydrostatic transmission 20B from being moved out of neutral, where a swash plate of the transmission 20B is positioned such that the output speed of the hydrostatic transmission 20B is zero. Particularly, as shown in FIG. 4, an output shaft 20A(OUT) of the engine 20A may be coupled to an input shaft 20B(IN) of a variable displacement pump P1 of the hydrostatic transmission 20B. The variable displacement pump P1 includes a swash plate S1 which has a tilt angle that is adjustable either directly by the handle 104, or indirectly by the handle 104 via control of the computing system 202. By adjusting the tilt angle of the swash plate S1, the magnitude and/or direction of the fluid pressure flow provided to drive a fixed displacement pump P2 of the hydrostatic transmission 20B changes. The fixed displacement pump P2 of the hydrostatic transmission 20B is connected (directly or indirectly) to an output shaft 20B(OUT) of the hydrostatic transmission 20B, which, in turn, is connected (directly or indirectly) to a drive shaft or axle AX1 rotatably connected to the wheel(s) 14, 16. As such, by changing the tilt angle of the swash plate S1, the driving force applied to the wheel(s) 14, 16 is affected. For instance, the fluid pressure flow may provide a forward driving force of varying magnitude, a rearward driving force of varying magnitude, or a neutral driving force (associated with a zero ground speed). When the service brake 21 is engaged, the service brake 21 works against rotation of the wheels 14, 16, and thus, rotation of the output shaft 20B (OUT) of the transmission 20B. As such, when the service brake 21 is engaged, the transmission 20B is usually held in neutral to prevent the hydrostatic transmission 20B and service brake 21 from working against each other.

However, if the agricultural sprayer 10 is held stationary by the service brake 21 on a sloped surface 60 and is facing in an uphill direction (as shown by arrow HD1 in FIG. 5), when the service brake 21 is released and the operator subsequently moves the handle 104 to command an output speed of the transmission to drive the sprayer in the uphill direction HD1, the hydrostatic transmission 20B may not ramp up fast enough to prevent roll-back of the sprayer 10 in the downhill direction (as shown by arrow HD2). Thus, as will be described in greater detail below with reference to FIG. 6, control logic is added in association with a computing system of the agricultural sprayer (e.g., system 200 shown in FIG. 6) that facilitates limited ramping up of the transmission output speed while the operator still has the service brake 21 engaged.

Figure 6:
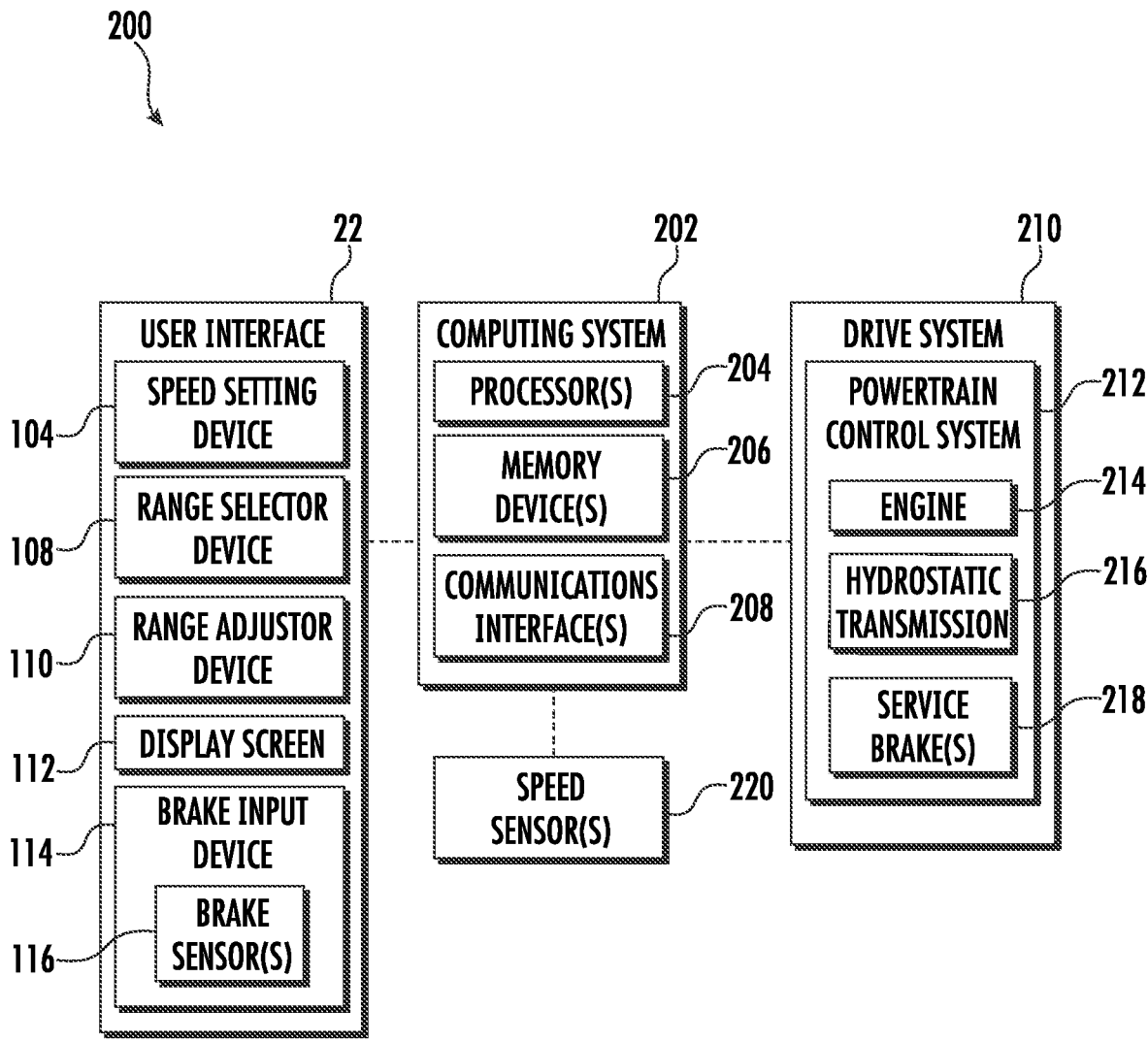
FIG. 6 illustrates a schematic view of an agricultural system for preventing roll-back of an agricultural vehicle on a sloped surface in accordance with aspects of the present subject matter.

Referring now to FIG. 6, a schematic view of one embodiment of a system 200 for preventing roll-back of an agricultural vehicle on a sloped surface is illustrated in accordance with aspects of the present subject matter. In general, the system 200 will be described herein with reference to the agricultural sprayer 10 described above with reference to FIGS. 1, 2, 4, and 5, and the example user interface 22 described above with reference to FIGS. 3A and 3B. However, it should be appreciated that the disclosed system 200 may generally be utilized with any other suitable agricultural vehicles, including, but not limited to, sprayers having any other suitable sprayer configuration, and/or with user interfaces having any other suitable interface configuration consistent with the disclosure provided herein.

In several embodiments, the system 200 may include a computing system 202 and various components, features, systems and/or sub-systems configured to be communicatively coupled to the computing system 202. In general, the computing system 202 may be configured to perform various computer-related functions or tasks, including, for example, receiving data from one or more components, features, systems and/or sub-systems of the sprayer 10, storing and/or processing data received or generated by the computing system 202, and/or controlling the operation of one or more components, features, systems and/or sub-systems of the sprayer 10.

In general, the computing system 202 may correspond to any suitable processor-based device(s), such as a computing device or any combination of computing devices. Thus, as shown in FIG. 6, the computing system 202 may generally include one or more processor(s) 204 and associated memory devices 206 configured to perform a variety of computer-implemented functions (e.g., performing the methods, steps, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 206 may generally be configured to store information accessible to the processor(s) 204, including data that can be retrieved, manipulated, created and/or stored by the processor(s) 204 and instructions that can be executed by the processor(s) 204.

As further shown in FIG. 6, the computing system 202 is configured to be communicatively coupled to the user interface 22 (e.g., including the speed setting device or handle 104, the range device(s) 108, 110, the display screen 112, the brake input device 114, and the brake sensor 116). As such, the computing system 202 may be configured to receive inputs from the different input devices 104, 108, 110, 112, 114, 116 which may indicate a desired or selected transmission output speed of the sprayer 10 and/or state of the service brake 21, to control the operation of the display screen 112 to display information about the speed of the sprayer 10 (e.g., the current transmission output and/or ground speed, the selected transmission output and/or ground speed, the selected transmission output and/or ground speed range, and/or the like).

Further, the computing system 202 is configured to be communicatively coupled to a drive system 210 of the agricultural sprayer 10, particularly to a powertrain control system 212 of the drive system 210. The computing system 202 may generally be configured to control the operation of the drive system 210 based at least in part on the inputs received from the user interface 22. The powertrain control system 212 generally includes an engine output control system 214, a transmission control system 216, and a braking control system 218. The engine output control system 214 is configured to vary the output of the engine 20A to control the maximum potential ground speed of the sprayer 10. For example, the engine output control system 214 may vary a throttle setting of the engine, a fuel/air mixture of the engine, a timing of the engine, and/or other suitable engine parameters to control engine output. In addition, the transmission control system 216 may adjust the magnitude and direction of the output speed of the transmission 20B (e.g., by adjusting an angle of the swash plate S1 of the hydrostatic transmission 20B) to control the ground speed of the sprayer 10. Furthermore, the braking control system 218 may adjust braking force of the service brake 21, thereby selectively preventing the sprayer 10 from moving (e.g., preventing the wheel(s) 14, 16 from rolling). While the illustrated powertrain control system 212 includes the engine output control system 214, the transmission control system 216, and the braking control system 218, it should be appreciated that alternative embodiments may include one or two of these systems, in any suitable combination. Further embodiments may include another powertrain control system having other and/or additional systems.

Moreover, in some embodiments, the computing system 202 is configured to be communicatively coupled to one or more sensors configured to detect a current ground speed of the sprayer 10. For instance, the computing system 202 may be communicatively coupled to one or more ground speed sensors 220 (hereinafter referred to as "speed sensor(s) 220") configured to generate data indicative of the ground speed of the sprayer 10. The data generated by the speed sensor(s) 220 may be transmitted to the computing system 202 for subsequent processing and/or for subsequent storage within the memory 206 of the computing system 202. The speed sensor(s) 220 may comprise any suitable sensor positioned at any suitable location on the sprayer 10 for generating data indicative of the ground speed of the sprayer 10, such as a radar sensor, a GPS sensor, and/or the like. In some embodiments, the speed sensor(s) 220 may be part of the drive system 210, such as part of the power-train control system 212, to monitor an operating parameter (e.g., rotational speed, rotational acceleration, and/or the like) of one or more components of the power-train control system 212 indicative of the sprayer ground speed.

Additionally, in some embodiments, the computing system 202 may be configured to include one or more communications modules or interfaces 208 for the computing system 202 to communicate with any of the various system components described herein. For instance, one or more communicative links or interfaces (e.g., one or more data buses) may be provided between the communications interface 208 and the user interface 22 (e.g., including the speed setting device or handle 104, the range device(s) 108, 110, the display screen 112, the brake input device 114, and brake sensor 116) to allow the computing system 202 to receive data indicative of a selected transmission output speed, a selected transmission output speed range, the engagement of the service brake 21, and/or the like from the user interface 22. Further, one or more communicative links or interfaces (e.g., one or more data buses) may be provided between the communications interface 208 and the vehicle drive system 210 (e.g., to the powertrain control system 212) to allow the computing system 202 to control the output speeds of the engine 20A and the hydrostatic transmission 20B as well as the engagement of the service brake 21. Additionally, one or more communicative links or interfaces (e.g., one or more data buses) may be provided between the communications interface 208 and the speed sensor(s) 220 to allow the computing system 202 to receive data indicative of the current ground speed of the sprayer 10.

The computing system 202 may generally be configured to control the ground speed of the sprayer 10 based at least in part on inputs received from the user interface 22. For example, the computing system 202 may be configured to control the output speed of the transmission 20B, and thus the ground speed of the sprayer 10, based at least in part on an input received from one or more of the speed setting device (i.e., handle 104), the range selector device 108, the range adjustor device 110, and/or the brake input device 114 (e.g., via brake sensor 116). More particularly, as discussed above, each position of the handle 104 is associated with a different speed across a transmission output speed range according to a predetermined speed mapping for the handle 104 (e.g., a predetermined speed mapping associated with a selected transmission output speed range). As such, the computing system 202 may control an operation of the drive system 210 (e.g., an operation of the hydrostatic transmission 20B) to adjust the ground speed of the agricultural sprayer 10 based at least in part on the selected transmission output speed associated with the actuated or selected position of the handle 104. For instance, the computing system 202 may control the operation of the drive system 210 to automatically increase or decrease the output speed of the transmission 20B from a current output speed of the transmission 20B to the selected output speed to increase or decrease the ground speed of the sprayer 10. Similarly, the computing system 202 may additionally or alternatively control the operation of the drive system 210 (e.g., the operation of the braking control system 218) to reduce the ground speed of the sprayer 10.

In accordance with aspects of the present subject matter, in several embodiments, when an operator provides an input (e.g., by moving the multi-function handle 104 located within the cab) to ramp-up the transmission output speed while the service brake 21 is at least partially engaged, the computing system 202 determines that a roll-back prevention mode is requested to prevent roll-back of the sprayer 10. In some embodiments, the roll-back prevention mode is confirmed or enabled when the sprayer 10 is determined, based at least in part on the data received from the speed sensor(s) 220, to be stationary at the same time the input is received from the multi-function handle 104 while the service brake 21 is engaged. In response to the roll-back prevention mode request, the computing system 202 automatically adjusts the speed mapping that maps each position of the handle 104 to a given speed within a speed range from the current speed mapping associated with the user selected output speed range (e.g., selected via the range device(s) 108, 110) to a reduced, roll-back speed mapping.

The roll-back speed mapping is associated with a lower transmission output speed range than the predetermined speed mapping. For instance, where the typical speed mapping may range from a first minimum speed to a first maximum speed, the roll-back speed mapping will generally range from a second minimum speed (e.g., which may be equal to the first minimum speed) to a second maximum speed that is less than the first maximum speed, including instances in which the second maximum speed is significantly less than the first maximum speed (e.g., a second maximum speed that is equal to less than 50% of the first maximum speed or less than 75% of the first maximum speed or less than 90% of the first maximum speed depending on which transmission output speed range was previously selected by the operator). Preferably, the speed range associated with the roll-back speed mapping only allows the transmission 20B to ramp up to the point where the output speed of the transmission 20B is just high enough to prevent roll-back of the sprayer 10 when the service brake 21 is fully released, but not high enough that the rotation of the transmission 20B causes damage to the service brake 21 or vice versa. In some embodiments, the roll-back speed mapping may be predetermined and stored within the memory 206 of the computing system 202. However, in other embodiments, the roll-hack speed mapping may be provided to the computing system 202 in any other suitable way.

After the speed mapping of the handle 104 has been adjusted to the roll-back prevention mapping, the computing system 202 then determines a transmission control command associated with the current or actuated position of the handle 104 according to the roll-back speed mapping. The transmission control command is then used to control the operation of the transmission 20B (e.g., the position of the swash plate S1 (FIG. 4) such that the output speed of the transmission 20B is equal to the commanded output speed associated with the position of the handle 104 according to the roll-back speed mapping while the service brake 21 is still engaged. When the transmission output speed is ramped-up to the operator-selected speed according to the roll-back speed mapping, the operator can then begin to release the service brake 21. If the operator does not feel that the sprayer 10 is beginning to roll-back and/or if the sprayer 10 begins moving up the hill, the service brake 21 can be fully released by the operator. However, if the sprayer 10 begins to roll-back as the services brakes 21 are being released, the operator can fully engage the service brake 21 again and command a higher transmission output speed (e.g., via the multi-function handle 104) within the range associated with the roll-back speed mapping. Once the transmission 20B has been commanded to provide the higher, commanded output speed, the operator can again slowly release the service brake 21 to determine if the newly commanded, higher speed is sufficient to maintain the sprayer 10 stationary on the upwardly sloped surface or hill (and/or sufficient to start the sprayer 10 moving up the hill). This process can be repeated as necessary until a sufficient transmission output speed has been obtained to prevent roll-back of the sprayer 10. Thus, the present agricultural system 200 reduces or completely prevents roll-back after releasing the brakes when on a hill.

In response to a brake-release input indicative of the service brake 21 being fully disengaged (e.g., when the brake input device 114 is moved to the disengaged position to disengage the service brake 21), the computing system 202 may adjust the applicable speed mapping of the handle 104 back to the previously applicable speed mapping.

Figure 7:
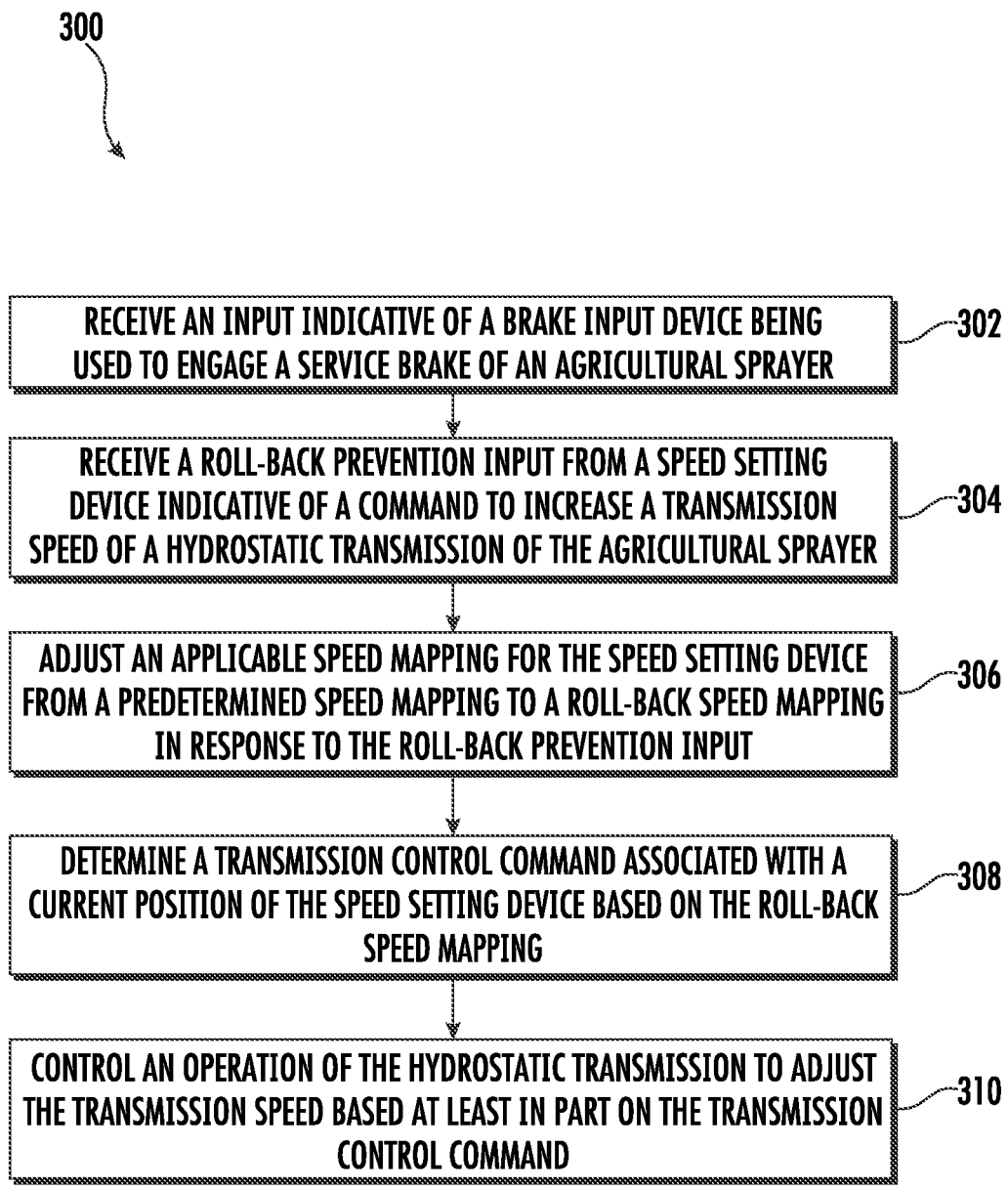
FIG. 7 illustrates a flow diagram of one embodiment of an agricultural method for preventing roll-back of an agricultural vehicle on a sloped surface in accordance with aspects of the present subject matter.

Referring now to FIG. 7, a flow diagram of one embodiment of a method 300 for preventing roll-back of an agricultural vehicle on a sloped surface is illustrated in accordance with aspects of the present subject matter. In general, the method 300 will be described herein with reference to the agricultural sprayer 10 described with reference to FIGS. 1, 2, 4, and 5, the user interface 22 described with reference to FIGS. 3A and 3B, and the computing system 200 described with reference to FIG. 6. However, it should be appreciated that the disclosed method 300 may be implemented with agricultural vehicles having any other suitable configuration, with user interfaces having any other suitable interface configuration, and/or with systems having any other suitable system configuration for performing the method described. In addition, although FIG. 7 depicts steps performed in a particular order for purposes of illustration and discussion, the methods discussed herein are not limited to any particular order or arrangement. One of ordinary skill in the art, using the disclosures provided herein, will appreciate that various steps of the method disclosed herein can be omitted, rearranged, combined, and/or adapted in various ways without deviating from the scope of the present disclosure.

As shown in FIG. 7, at (302), the method 300 may include receiving, with one or more computing devices, an input indicative of the brake input device being used to engage the service brake. For instance, as discussed above, the computing system 202 may receive an input from the brake sensor 116 indicative of the brake input device 114 being moved into the engaged position to engage the service brake 21.

Further, at (304), the method 300 may include receiving, with the one or more computing devices, a roll-back prevention input from the speed setting device indicative of a command to increase the transmission speed of the hydrostatic transmission while the service brake is engaged. For example, as described above, an operator may move the handle 104 such that the computing system 202 may receive an input from the handle 104 indicative of a command to increase the transmission speed of the hydrostatic transmission 20B while the service brake 21 is still engaged.

At (306), the method 300 may further include adjusting, with the one or more computing devices, an applicable speed mapping for the speed setting device from the predetermined speed mapping to a roll-back speed mapping in response to the roll-back prevention input, with the roll-back speed mapping being associated with a reduced speed range as compared to the speed range for the predetermined speed mapping. For instance, as described above, the computing system 202 may adjust the speed mapping for the handle 104 from a predetermined speed mapping associated with a speed range, such as a user selected transmission output speed range, to a roll-back speed mapping associated with a transmission output speed range that is reduced in comparison to the speed range associated with the predetermined speed mapping.

Moreover, at (308), the method 300 may include determining, with the one or more computing devices, a transmission control command associated with a current position of the speed setting device based on the roll-back speed mapping. For example, as discussed above, the computing system 202 may determine a control command to ramp the transmission output speed to the commanded transmission output speed associated with the current or actuated position of the handle 104 according to the roll-back speed mapping.

Additionally, at (310), the method 300 may include controlling, with the one or more computing devices, an operation of the hydrostatic transmission to adjust the transmission speed based at least in part on the transmission control command. For instance, as discussed above, the computing system 202 may then control an operation of the hydrostatic transmission 20B (e.g., an operation of the transmission control system 216) to adjust the transmission output speed based at least in part on the transmission control command.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural method for preventing roll-back of an agricultural vehicle, the agricultural vehicle including a hydrostatic transmission, a speed setting device for commanding a selected transmission speed of the hydrostatic transmission, the speed setting device being movable across a plurality of positions, with each position of the speed setting device being associated with a different transmission speed across a speed range for the agricultural vehicle according to a predetermined speed mapping for the speed setting device, the agricultural vehicle further including a brake input device movable for selectively engaging a service brake of the agricultural vehicle, the method comprising:
receiving, with one or more computing devices, an input indicative of the brake input device being used to engage the service brake;
receiving, with the one or more computing devices, a roll-back prevention input from the speed setting device indicative of a command to increase the transmission speed of the hydrostatic transmission while the service brake is engaged;
adjusting, with the one or more computing devices, an applicable speed mapping for the speed setting device from the predetermined speed mapping to a roll-back speed mapping in response to the roll-back prevention input, the roll-back speed mapping being associated with a reduced speed range as compared to the speed range for the predetermined speed mapping;
determining, with the one or more computing devices, a transmission control command associated with a current position of the speed setting device based on the roll-back speed mapping; and
controlling, with the one or more computing devices, an operation of the hydrostatic transmission to adjust the transmission speed based at least in part on the transmission control command.

2. The agricultural method of claim 1, further comprising receiving, with the one or more computing devices, an input indicative of the agricultural vehicle being stationary.

3. The agricultural method of claim 2, wherein receiving the roll-back prevention input comprises receiving the roll-back prevention input while the service brake is engaged and the agricultural vehicle is stationary.

4. The agricultural method of claim 2, wherein the agricultural vehicle further comprises a speed sensor configured to generate data indicative of a ground speed of the agricultural vehicle,
wherein the input indicative of the agricultural vehicle being stationary is received from the speed sensor.

5. The agricultural method of claim 1, further comprising:
receiving, with the one or more computing devices, a brake-release input indicative of the brake input device being released to disengage the service brake; and
adjusting, with the one or more computing devices, the applicable speed mapping for the speed setting device back to the predetermined speed mapping in response to the brake-release input.

6. The agricultural method of claim 1, wherein the speed range for the predetermined speed mapping ranges from a first minimum speed to a first maximum speed and the reduced speed range for the roll-back speed mapping ranges from a second minimum speed to a second maximum speed, the second maximum speed being lower than the first maximum speed.

7. The agricultural method of claim 1, wherein the agricultural vehicle comprises an agricultural sprayer.

8. The agricultural method of claim 1, wherein the speed setting device is a speed control lever.

9. An agricultural system for preventing roll-back of an agricultural vehicle, the agricultural system comprising:
a hydrostatic transmission for selectively driving one or more wheels of the agricultural vehicle;
a speed setting device for commanding a selected transmission speed of the hydrostatic transmission, the speed setting device being movable across a plurality of positions, with each position of the speed setting device being associated with a different transmission speed across a speed range for the agricultural vehicle according to a predetermined speed mapping for the speed setting device;
a brake input device movable for selectively engaging a service brake, the service brake preventing movement of the one or more wheels when engaged, the brake input device being movable between an engaged position, associated with the service brake being engaged, and a disengaged position, associated with the service brake being disengaged; and
a computing system communicatively coupled to the hydrostatic transmission, the speed setting device, and the brake input device, the computing system being configured to:
receive an input indicative of the brake input device being used to engage the service brake;
receive a roll-back prevention input from the speed setting device indicative of a command to increase the transmission speed of the hydrostatic transmission while the service brake is engaged;
adjust an applicable speed mapping for the speed setting device from the predetermined speed mapping to a roll-back speed mapping in response to the roll-back prevention input, the roll-back speed mapping being associated with a reduced speed range as compared to the speed range for the predetermined speed mapping;
determine a transmission control command associated with a current position of the speed setting device based on the roll-back speed mapping; and
control an operation of the hydrostatic transmission to adjust the transmission speed based at least in part on the transmission control command.

10. The agricultural system of claim 9, wherein the computing system is further configured to receive an input indicative of the agricultural vehicle being stationary.

11. The agricultural system of claim 10, wherein the roll-back prevention input is received while the service brake is engaged and while the agricultural vehicle is stationary.

12. The agricultural system of claim 10, further comprising a speed sensor configured to generate data indicative of a ground speed of the agricultural vehicle, wherein the input indicative of the agricultural vehicle being stationary is received from the speed sensor.

13. The agricultural system of claim 9, wherein the computing system is further configured to:
   receive a brake-release input indicative of the brake input device being moved to the disengaged position to disengage the service brake; and
   adjust the applicable speed mapping for the speed setting device back to the predetermined speed mapping in response to the brake-release input.

14. The agricultural system of claim 9, wherein the speed range for the predetermined speed mapping ranges from a first minimum speed to a first maximum speed and the reduced speed range for the roll-back speed mapping ranges from a second minimum speed to a second maximum speed, the second maximum speed being lower than the first maximum speed.

15. The agricultural system of claim 9, wherein the agricultural vehicle comprises an agricultural sprayer.

16. The agricultural system of claim 9, wherein the speed setting device is a speed control lever.

\* \* \* \* \*